(12) United States Patent
Zhu et al.

(10) Patent No.: US 10,009,543 B2
(45) Date of Patent: Jun. 26, 2018

(54) METHOD AND APPARATUS FOR DISPLAYING SELF-TAKEN IMAGES

(71) Applicant: Smartisan Digital Co., Ltd., Beijing (CN)

(72) Inventors: Xiaomu Zhu, Beijing (CN); Zhaofei Wang, Beijing (CN)

(73) Assignee: SMARTISAN DIGITAL CO., LTD, Beijing (CN)

( * ) Notice: Subject to any disclaimer, the term of this patent is extended or adjusted under 35 U.S.C. 154(b) by 33 days.

(21) Appl. No.: 14/778,207

(22) PCT Filed: Dec. 30, 2013

(86) PCT No.: PCT/CN2013/090866
§ 371 (c)(1),
(2) Date: Sep. 18, 2015

(87) PCT Pub. No.: WO2014/154003
PCT Pub. Date: Oct. 2, 2014

(65) Prior Publication Data
US 2016/0286131 A1   Sep. 29, 2016

(30) Foreign Application Priority Data
Mar. 25, 2013 (CN) .......................... 2013 1 0097585

(51) Int. Cl.
*H04N 5/232* (2006.01)
*H04N 5/262* (2006.01)

(52) U.S. Cl.
CPC ..... *H04N 5/23293* (2013.01); *H04N 5/23216* (2013.01); *H04N 5/23229* (2013.01); *H04N 5/23245* (2013.01); *H04N 5/2621* (2013.01)

(58) Field of Classification Search
CPC ....................................................... H04N 5/222
See application file for complete search history.

(56) References Cited

U.S. PATENT DOCUMENTS 9,332,167 B1 * 5/2016 Pance .................. H04N 5/2258
2004/0021792 A1 * 2/2004 Yasui .................. H04N 5/2253
348/373
(Continued)

FOREIGN PATENT DOCUMENTS

CN   1604620 A   4/2005
CN   1620795 A   5/2005
(Continued)

OTHER PUBLICATIONS

International Search Report with English translation dated Mar. 20, 2014 from corresponding International Patent Application No. PCT/CN2013/090866, 5 pages.
(Continued)

*Primary Examiner* — Trung Diep
(74) *Attorney, Agent, or Firm* — Ohlandt, Greeley, Ruggiero & Perle, LLP

(57) ABSTRACT

A method for displaying self-taken images. The method comprises: acquiring a self-taken image; receiving selection information relating to the processing method of the self-taken image, said processing method being mirror image processing or non-mirror image processing; and, on the basis of the selection information, carrying out the corresponding processing of the self-taken image and displaying the processed image. Also disclosed is an apparatus for displaying self-taken images. The embodiments may enhance the efficiency of displaying self-taken images.

19 Claims, 3 Drawing Sheets

(56) References Cited

U.S. PATENT DOCUMENTS

| | | |
|---|---|---|
| 2005/0073600 A1 | 4/2005 | Sato |
| 2005/0151830 A1 | 7/2005 | Yamazaki |
| 2006/0044396 A1* | 3/2006 | Miyashita ............ H04N 5/2252 348/207.99 |
| 2006/0119472 A1* | 6/2006 | Tsuboi .................. B60Q 9/005 340/435 |
| 2011/0187914 A1* | 8/2011 | Lee ........................ H04N 5/222 348/333.11 |
| 2012/0047340 A1 | 2/2012 | Inaba |

FOREIGN PATENT DOCUMENTS

| | | |
|---|---|---|
| CN | 1645450 A | 7/2005 |
| CN | 1708093 A | 12/2005 |
| CN | 102245100 A | 11/2011 |
| CN | 102655568 A | 9/2012 |
| CN | 102664825 A | 9/2012 |
| CN | 103152489 A | 6/2013 |
| EP | 1473908 A1 | 11/2004 |
| JP | 2003198920 A * | 11/2003 .............. H04M 1/00 |
| WO | 2013131344 A1 | 9/2013 |

OTHER PUBLICATIONS

Written Opinion with English translation dated Mar. 20, 2014 from corresponding International Patent Application No. PCT/CN2013/090866, 16 pages.

Chinese 2nd Office Action with English translation dated Aug. 21, 2014 from corresponding Chines Application No. 201310097585.9, 13 pages.

Zhang, Papa; "Talking Photographing Self only! PK of two self-timer CASIO TR350 and MeituKiss"; Feb. 22, 2010; Mobile.hiapk.com/new/130722/1439358; 12 pages.

"Lenovo Le Phone S720: A Smartphone Only for Women"; Computer Fun (Learning Edition); Nov. 2012, No. 11, pp. 104-105, ISSN: 1673-3931.

International Search Report dated Mar. 20, 2014 for PCT application No. PCT/CN2013/090866.

* cited by examiner

METHOD AND APPARATUS FOR DISPLAYING SELF-TAKEN IMAGES

CROSS REFERENCE OF RELATED APPLICATION

The present application is a national phase of International Application No. PCT/CN2013/090866 titled "METHOD AND APPARATUS FOR DISPLAYING SELF-TAKEN IMAGES", filed on Dec. 30, 2013, which claims the priority to Chinese Patent Application No. 201310097585.9, titled "METHOD AND APPARATUS FOR DISPLAYING SELFIE IMAGE", filed on Mar. 25, 2013 with the State Intellectual Property Office of People's Republic of China, both of which are incorporated herein by reference in their entireties.

BACKGROUND

1. Field of the Disclosure

The disclosure relates to the technical field of information processing, and in particular to a method for displaying a selfie image and an apparatus for displaying a selfie image.

2. Discussion of the Background Art

With the development of the shooting technology, people may shoot an object by means of various types of shooting devices (for example a dedicated camera, or a built-in camera of the mobile terminal), to capture an image of the object. The shooting of the object include two types. One type is common shooting, i.e., a remote object far away from the camera and the photographer is shot using the shooting device, for example a prospect is shot by using a digital camera or a rear camera of a mobile terminal; another type is special shooting, i.e., a proximal object between the camera and the photographer is shot using the shooting device, which is commonly known as "self-portrait photographing" (i.e. selfie). In case of the selfie, the shot image is stored in the shooting device in one of two ways. In a first way, the shot image is directly stored without any processing. For example, the image is shot in a mirroring (non-mirroring) form and also stored in the mirroring (non-mirroring) form. In a second way, the shot image is stored after certain processing. For example, the image is shot in a mirroring (non-mirroring) form and stored in the non-mirroring (mirroring) form. When displaying the selfie image, the selfie image is displayed based on the way in which it is stored in the shooting device.

The selfie image may be processed in different modes. It is processed by default in one of mirroring-processing-mode (for example, in case that it is shot by a front camera) and non-mirroring-processing-mode (for example, in case that it is shot by a rear camera). When the shot image is displayed, users whose demands usually are different may find that the displayed image is not satisfactory. In this situation, users generally turn to specialized image editing software to process the image professionally and then the processed image is displayed, which however requires additional operations other than shooting and displaying. Thus efficiency for displaying the selfie image is decreased.

SUMMARY

In order to solve the above technical problem, a method for displaying a selfie image and an apparatus for displaying a selfie image are provided according to embodiments of the present disclosure, to improve efficiency for displaying the selfie image.

A method for displaying a selfie image is provided according to embodiments of the present disclosure, which includes:

capturing the selfie image, receiving selection information of a processing mode for the selfie image, where the processing mode is mirroring processing or non-mirroring processing; and processing the selfie image based on the selection information, and displaying the processed selfie image.

Preferably, capturing the selfie image may include: calling a photographing function by a shooting application to perform sampling; triggering, by the photographing function, a photographing callback function registered in the shooting application to receive sampled data; and returning, by the photographing callback function, the selfie image in a form of an array of bytes.

Further preferably, processing the selfie image based on the selection information may include:

determining whether the received selection information is consistent with information of a preset processing mode; if the received selection information is inconsistent with the information of the preset processing mode, performing matrix transformation on the selfie image returned by the photographing callback function, so that the selfie image returned by the photographing callback function is flipped with respect to a Y axis; and storing the flipped selfie image; and where displaying the processed image may include: displaying the matrix-transformed selfie image.

Further preferably, performing matrix transformation may include:

generating a matrix transformation factor according to the following equation:

$$M'=S(sx,sy)*M,$$

where M represents an identity matrix, M' represents the matrix transformation factor, and S (sx, sy) represents a transformation coefficient, where sx=1, and sy=−1; and performing transformation on the selfie image using the matrix transformation factor.

Preferably, a button for switching of a mirroring-processing-mode and/or a non-mirroring-processing-mode may be presented on a shooting screen during shooting the selfie image; when the button is triggered, receiving selection information of a processing mode for the selfie image may include: receiving a switched processing mode for the selfie image as the selection information.

Further preferably, the switched processing mode for the selfie image may be presented on the shooting screen, when the button is triggered.

A apparatus for displaying a selfie image is provided according to the embodiments of the present disclosure, which includes an image capturing unit, a selection information receiving unit, an image processing unit and an image displaying unit, where the image capturing unit is configured to capture the selfie image;

the selection information receiving unit is configured to receive selection information of a processing mode for the selfie image, where the processing mode is mirroring processing or non-mirroring processing;

the image processing unit is configured to process the selfie image based on the selection information; and the image displaying unit is configured to display the processed selfie image.

Preferably, the image capturing unit may include a sampling sub-unit and a selfie image returning sub-unit; and the sampling sub-unit may be configured to call a photographing function via a shooting application to perform sampling, and the selfie image returning sub-unit is configured to trigger, via the photographing function, a photographing callback function registered in the shooting application to receive the sampled data, and return the selfie image in a form of an array of bytes.

Further preferably, the image processing unit may include a determining sub-unit, a transforming sub-unit and a storing sub-unit, where the determining sub-unit may be configured to determine whether the received selection information is consistent with information of a preset processing mode; and trigger the transforming sub-unit if the received selection information is inconsistent with the information of the preset processing mode;

the transforming sub-unit may be configured to perform matrix transformation on the selfie image returned by the photographing callback function, so that the selfie image returned by the photographing callback function is flipped with respect to a Y axis;

the storing sub-unit may be configured to store the flipped selfie image; and the image displaying unit may be configured to read out and display the stored flipped selfie image.

Preferably, the apparatus may further include a button presenting unit, configured to present a button for switching of a mirroring-processing-mode and/or a non-mirroring-processing-mode on a shooting button during shooting the selfie image; and the selection information receiving unit may be configured to receive a switched processing mode for the selfie image as the selection information, when the button is triggered.

Further preferably, the apparatus may further include a processing mode presenting unit, configured to present the switched processing mode for the selfie image on the shooting screen when the button is triggered.

In the embodiments of the present disclosure, before (or during or after) the selfie image is captured, the selection information of the processing mode for the selfie image is received, then the selfie image is processed based on the selection information, and the processed image is displayed. As compared with the conventional technology, before the selfie image is displayed, the selfie image is mirroring processed or non-mirroring processed based on the received selection information of the processing mode, such that the displayed selfie image meets the requirement of the user, and it is not necessary to perform extra operations using a specialized image editing device. Thereby the efficiency for displaying the selfie image is improved.

BRIEF DESCRIPTION OF THE DRAWINGS

In order to illustrate technical solutions in embodiments of the present disclosure or the conventional technology more clearly, hereinafter drawings to be used in the description of the embodiments or the conventional technology will be introduced simply. Apparently, the drawings described below only describe some embodiments of the present disclosure, and other embodiments and drawings may be obtained based on the embodiments described by these drawings by those skilled in the art.

DETAILED DESCRIPTION OF THE PREFERRED EMBODIMENTS

In order to better understand technical solutions of the present disclosure by those skilled in the art, hereinafter the technical solutions in embodiments of the present disclosure will be described clearly and completely in conjunction with the drawings of the embodiments of the present disclosure. Apparently, the described embodiments are only some rather than all the embodiments of the present disclosure. Any other embodiments obtained based on the embodiments of the present disclosure by those skilled in the art without any creative work fall within a scope of protection of the present disclosure.

Figure 1:
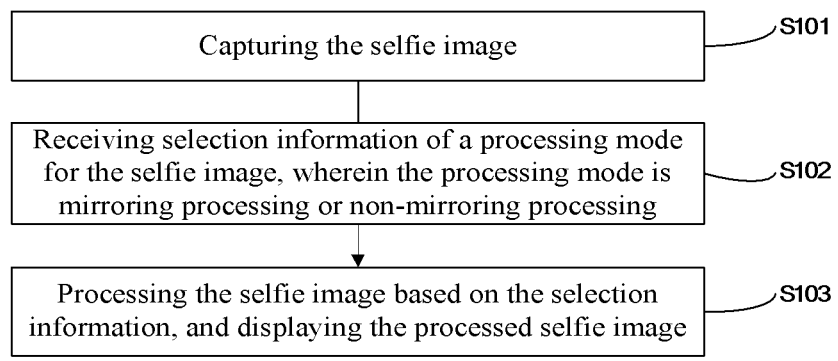
FIG. 1 is a flowchart of a method for displaying a selfie image according to an embodiment of the present disclosure.

Reference is made to FIG. 1, which shows a flowchart of a method for displaying a selfie image according to an embodiment of the present disclosure. The method includes step S101 to step S103.

In step S101, a selfie image is captured.

In the embodiment, the selfie image is captured by performing a selfie operation on a selfie device, and here the image is not limited to a picture or a photo in a narrow sense, and may also include a cut-out image of a video flow at a certain time instant and a text picture generated by performing an operation on a text and having a format of a picture. The selfie image may be captured in many ways. For example, the selfie image may be read from a picture database where pictures shot by a specialized photographing device are stored, i.e. a static way for capturing the selfie image. Alternatively the selfie image may also be captured in real time using a shooting device, i.e. a dynamic way for capturing the selfie photograph. For example, a user holds a mobile phone and performs a selfie shooting via a camera to capture a selfie image.

In step S102, selection information of a processing mode for the selfie image is received, where the processing mode is mirroring processing or non-mirroring processing.

In the embodiment, processing modes for the selfie image include a mirroring processing mode and a non-mirroring processing mode. The mirroring processed selfie image is a mirror image of the actual object, i.e., it looks like that the object is in the mirror. The actual object corresponds to an image obtained by flipping the mirroring processed selfie image left and right in a horizontal direction. The non-mirroring processed selfie image is the same as the actual object. Different users have different preferences. Some users like that the finally displayed image is the same as that observed during the shooting process, i.e., what you see is what you get. Some users like that the finally displayed image is the same as the actual object. It should be noted that, in the embodiment step S102 follows step S101, and in the practical application process, the order of step S101 and step S102 is not limited. That is, the selection information of a processing mode for the selfie image may be received before the selfie image is captured. For example the image processing mode is set before performing selfie shooting using a mobile phone. In this case the selection information of the processing mode for the selfie image is received before the selfie image is captured. Alternatively the selection information may be received during or after the selfie image is captured. For example, after the selfie image is captured by performing selfie shooting using the mobile phone, a prompt is presented on the screen of the mobile phone so that the user selects a processing mode for the selfie image.

In step S103, the selfie image is processed based on the selection information and the processed image is displayed.

After the selfie image and the selection information of the processing mode for the selfie image are obtained, the selfie image may be processed based on the selection information. For example, if the received processing mode for the selfie image is mirroring processing, the selfie image is mirroring processed. If the received processing mode for the selfie image is non-mirroring processing, the selfie image is non-mirroring processed. After the selfie image is processed based on the selection information, the processed image is displayed.

In the embodiment, before (or during or after) the selfie image is captured, the selection information of the processing mode for the selfie image is received, then the selfie image is processed based on the selection information, and the processed image is displayed. As compared with the conventional technology, before the selfie image is displayed, the selfie image is mirroring processed or non-mirroring processed based on the received selection information of the processing mode, such that the displayed selfie image meets the requirement of the user, and it is not necessary to perform extra operations using a specialized image editing device. Thereby the efficiency for displaying the selfie image is improved. In addition, in the embodiment the user does not need to adjust the selfie image using an image editing software, and thereby facilitating the use by the user, increasing the preference of the use for a brand, and improving satisfaction of the user on performing the selfie operation using the selfie function.

In the above embodiment, in the case that the selfie image is captured by dynamically generating the selfie image in real time, the specific capturing process is as follows. After automatic photographing is started, sampling is performed by calling a photographing function using a camera application. Sampled data is transferred in a form of an array of bytes to a photographing callback function registered in the camera application. The callback function gets the sampled data to make up the selfie image. Here the photographing function may be takePicture( ), one function in the android-.hardware.Camera packet, which is mainly used to capture an image. Calling the function by the camera application indicates that photographing will is starting. The function takePicture( ) includes four parameters: Camera.Shutter-Callback shutter, Camera.PictureCallback raw, Camera.PictureCallback postview, Camera.PictureCallback jpeg, where shutter represents a callback function used when an image is captured. Once the image is captured, this callback function is called; raw represents a raw (not compressed) image data callback function, and once the raw image data is available, this callback function is called; postview represents a callback function for postview image data, and once the zoomed and completely processed postview image is available, this callback function is called; and jpeg represents a JPEG image data callback function, and once a compressed JPEG image is available, this callback function is called. A calling format of the function is as follows:

takePicture (Camera.ShutterCallback shutter, Camera.PictureCallback raw, Camera.PictureCallback postview, Camera.PictureCallback jpeg).

After the selfie image is captured by calling the photographing function and the callback function, if without considering the state in which the photographing system stays before the selection information of the processing mode for the selfie image is received (or referred to as a default state), the selfie image is directly processed based on the received processing mode regardless of the initial state of the photographing system which may be set as the mirroring processing mode or the non-mirroring processing mode. Thereby resource may be wasted. For example, in the case that a default processing mode of the selfie image for the photographing system is the mirroring processing, the selfie image captured by the selfie operation is a mirror image and the received processing mode for the selfie image is also the mirroring processing, it is not necessary to perform mirroring processing. Based on the above, in the present disclosure, preferably before the selfie image is processed, it is determined whether the received selection information is consistent with information of the preset processing mode. If the received selection information is consistent with the information of the preset processing mode, the image is directly stored based on the preset mode without processing; otherwise, the selfie image is processed. As described above, the selfie image is captured by calling the photographing function and the callback function. A matrix transformation is performed on the byte array obtained by the photographing callback function, such that the byte data obtained by the photographing callback function is flipped with respect to a Y axis (for example, flipped symmetrically), and then the flipped byte data is stored. Here the matrix transformation may be implemented in many specific ways, and in the present disclosure preferably it is implemented in the following way.

A matrix transformation factor is generated according to the following equation:

$$M'=S(sx,sy)*M.$$

In the above equation, M represents an identity matrix, M' represents the matrix transforming factor, and S (sx, sy) represents a transforming coefficient, where sx=1 and sy=−1.

A transforming processing is performed on the selfie image using the matrix transformation factor, i.e., the matrix transformation factor is applied to the selfie image data.

In the above embodiment, the selection information of the processing mode for the selfie image may be received in various ways. For example, once the photographing system is started, pictures stored by the user in the picture database are automatically detected. Preference of the user may be known by analyzing these pictures, and the selection information of the processing mode for the selfie image may be generated automatically. Alternatively, a default mode set by the user is directly taken as the selection information of the processing mode for the selfie image. In the present disclosure, preferably a button for switching between the mirroring-processing-mode and the non-mirroring-processing-mode is presented on a shooting screen during shooting a selfie image. A switched processing mode for the selfie image is received as the selection information, when the button is triggered. In the present disclosure, the number of buttons and the form of the button are not limited. For example, for facilitating operation, two buttons may be provided, where on button is configured to trigger mirroring processing mode and the other button is configured to trigger non-mirroring processing mode. Alternatively, one button is provided, and words "mirroring processing mode" or "non-mirroring processing mode" are displayed on the button.

Words "non-mirroring processing mode" or "mirroring processing mode" are displayed once the button is clicked. For example, the button may be a physical button disposed on the selfie device, or may be an icon on the shooting screen. Furthermore, when the button is triggered, the switched processing mode for the selfie image may be presented on the shooting screen.

Figure 2A:
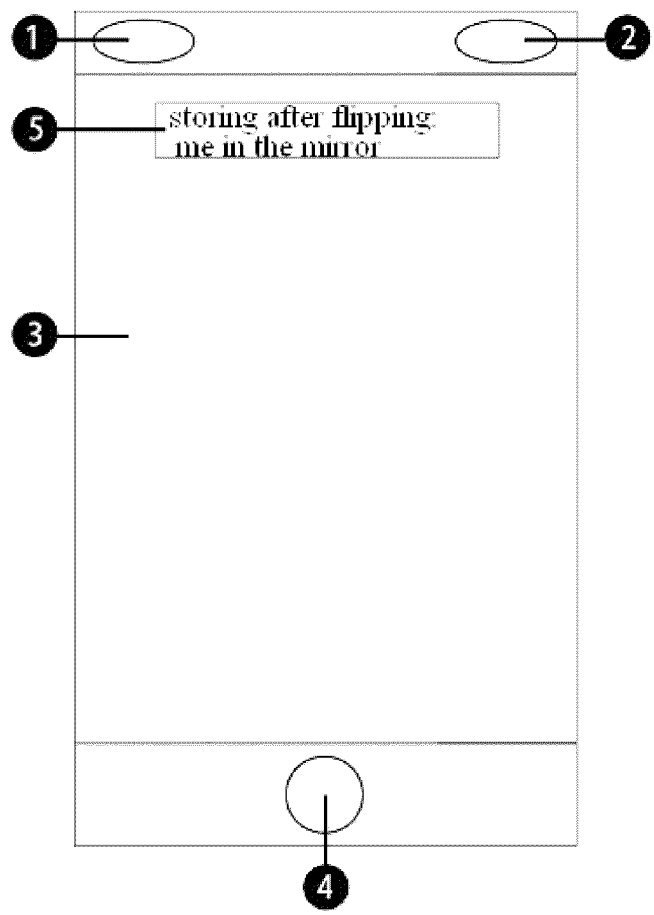
FIG. 2(a) is a schematic diagram of a shooting interface of a front camera of a selfie device according to an example of the present disclosure.
Figure 2B:
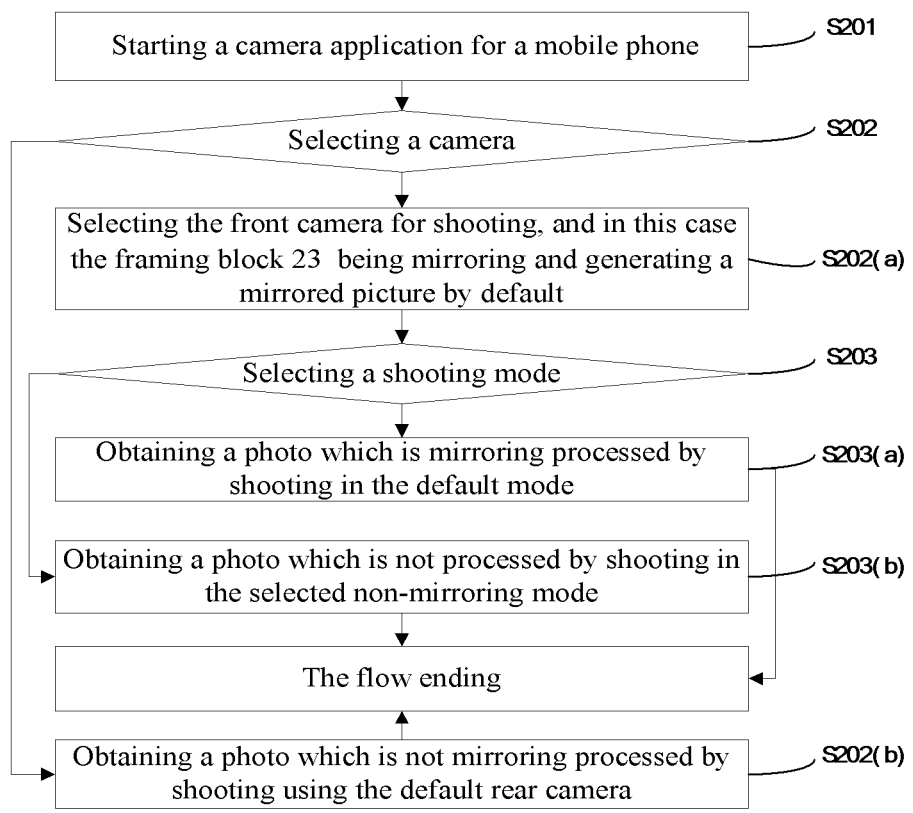
FIG. 2(b) is a flowchart according to an example of the present disclosure.

The technical solution of the present disclosure is described in detail in the above embodiment, and hereinafter a specific example is clarified to illustrate technical features of the present disclosure better. Reference is made to FIG. 2(a) and FIG. 2(b), which are respectively a schematic diagram of a shooting interface of a front camera of a selfie device according to an embodiment of the present disclosure, and a flowchart of the embodiment. In FIG. 2(a), ☐ represents a mirroring/non-mirroring switching button, ② represents a front/rear camera switching button, ③ represents a framing area, ④ represents a shutter, and ⑤ represents state prompt words: "directly storing: actual me", "storing after flipping: me in the mirror". The flow of photographing using the selfie device described above is as follows.

In step S201, a camera application for a mobile phone is started. In the embodiment, the default camera is the rear camera, the framing block ③ is non-mirroring and generates a non-mirror photo.

In step S202, it is determined which camera is selected. Step S202 (a) is performed, in the case that a front camera is selected; and step S202 (b) is performed, in the case that the default rear camera is selected.

In step 202 (a), a photo which is not mirroring processed is obtained by shooting using the default rear camera, and the flow ends.

In step 202 (b), the front button is selected for shooting, and in this case the framing block ③ is mirroring and a mirror picture is generated by default.

In step S203, a shooting mode is selected. Step S203 (a) is performed, in the case that a default mode is selected; and step S203 (b) is performed, in the case that the non-mirroring mode is selected.

In step S203 (a), a photo which is mirroring processed is obtained by shooting in the default mode, and the flow ends.

In step S203 (b), a photo which is not processed is obtained by shooting in the selected non-mirroring mode.

Figure 3:
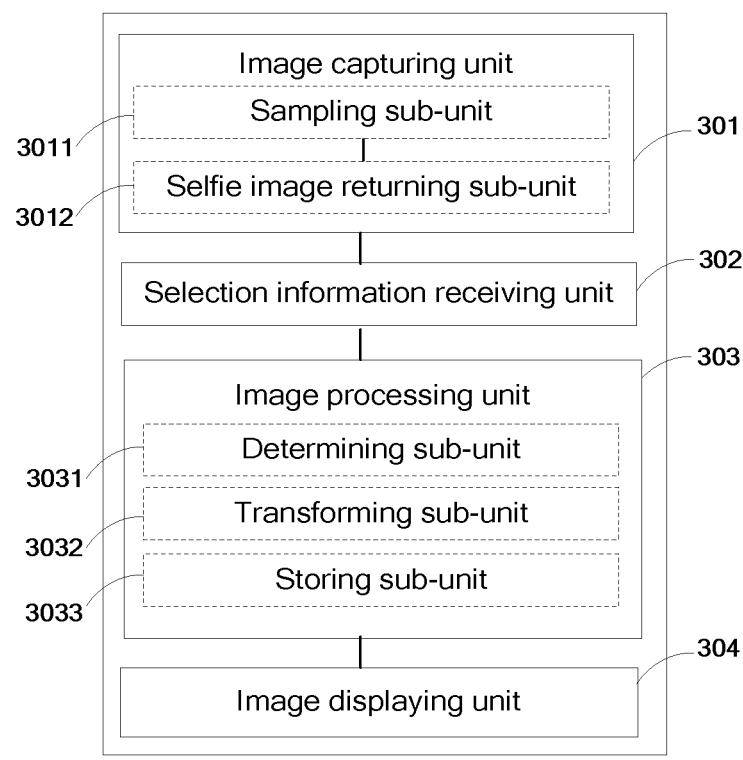
FIG. 3 is a structural block diagram of an apparatus for displaying a selfie image according to the present disclosure.

In the above, the embodiment of the method for displaying a selfie image according to the present disclosure is described in detail. Correspondingly an apparatus for displaying a selfie image is further provided according to an embodiment of the present disclosure. Reference is made to FIG. 3, which shows a structural block diagram of the apparatus for displaying a selfie image according to the embodiment of the present disclosure. The apparatus includes an image capturing unit 301, a selection information receiving unit 302, an image processing unit 303 and an image displaying unit 304.

The image capturing unit 301 is configured to capture a selfie image.

The selection information receiving unit 302 is configured to receive selection information of a processing mode for the selfie image, where the processing mode is mirroring processing or non-mirroring processing.

The image processing unit 303 is configured to process the selfie image based on the selection information.

The image displaying unit 304 is configured to display the processed image.

The work process of the above apparatus is as follows: before, during or after the image capturing unit 301 captures a selfie image, the selection information receiving unit 302 receives selection information of the processing mode for the selfie image, where the processing mode is mirroring processing or non-mirroring processing; then the image processing unit 303 processes the selfie image based on the selection information, and the image displaying unit 304 displays the processed image.

In the embodiment, before (or during or after) the selfie image is captured, the selection information of the processing mode for the selfie image is received, then the selfie image is processed based on the selection information, and the processed image is displayed. As compared with the conventional technology, before the selfie image is displayed, the selfie image is mirroring processed or non-mirroring processed based on the received selection information of the processing mode, such that the displayed selfie image meets the requirement of the user, and it is not necessary to perform extra operations using a specialized image editing device. Thereby the efficiency for displaying the selfie image is improved.

For different capturing modes, the image capturing unit of the apparatus in the embodiment may have different structures. In the present disclosure, preferably the image capturing unit captures an image in a dynamic mode, and in this case the image capturing unit 301 may include a sampling sub-unit 3011 and a selfie image returning sub-unit 3012. Specifically, the sampling sub-unit 3011 is configured to call a photographing function using a shooting application to perform sampling. The selfie image returning sub-unit 3012 is configured to trigger, via the photographing function, a photographing callback function registered in the shooting application to receive sampled data, and return the selfie image in a form of an array of bytes.

Like the structure of the image capturing unit described above and based on the same principle, the image processing unit 303 of the apparatus in the embodiment may include a determining sub-unit 3031, a transforming sub-unit 3032 and a storing sub-unit 3033.

The determining sub-unit 3031 is configured to determine whether the received selection information is consistent with information of the preset processing mode. The transforming sub-unit is triggered, in the case that the received selection information is inconsistent with the information of the preset processing mode.

The transforming sub-unit 3032 is configured to perform matrix transformation on the selfie image returned by the photographing callback function, such that the selfie image is flipped with respect to a Y axis.

The storing sub-unit 3033 is configured to store the flipped selfie image.

For the structure of the image processing unit described above, the image displaying unit 304 is configured to read out and display the stored flipped selfie image.

Based on various actual considerations, the apparatus may further include: a button presenting unit, configured to present a button for switching between the mirroring-processing-mode and the non-mirroring-processing-mode on a shooting screen during shooting a selfie image; and a selection information receiving unit, configured to receive a switched processing mode for the selfie image as the selection information, when the button is triggered. Further preferably, the apparatus may further include a processing mode presenting unit, configured to present the switched processing mode for the selfie image on the shooting screen, when the button is triggered. By adding a button on the shooting screen, the user may select a corresponding button or a state to be presented of the button as needed during shooting, thereby the selfie image is processed based on a processing mode for the selfie image indicated by the button. The image is processed according to the actual requirement of the user. Therefore it is not necessary to perform extra operations by the user on the selfie image by using a specialized picture editing software.

It should be noted that, for facilitating describing, the embodiments of the specification and various variations of the embodiments each lay emphasis on difference from other embodiments or variations, and for the same or similar parts between embodiments or variations, one may refer to the description of other embodiments or variations. Particularly, for the several improved embodiments of the apparatus embodiment, since they are substantially the same as the method embodiment, the description is relatively simple and for the related parts one may refer to the illustration of the method embodiment. Various units of the apparatus described above may be physically separated or not, i.e., locating at the same place or distributing in multiple network environments. In the actual application process, some or all of the units of the apparatus may be selected to achieve the objects of the technical solutions of the embodiments as needed, and those skilled in the art can understand and implement the present disclosure without any creative work.

The specific embodiments of the present disclosure are described above. It should be noted that, those skilled in the art may make several improvements and modifications without departing from the principles of the present disclosure, and theses improvements and modifications should be included in the scope of protection of the present disclosure.

The invention claimed is:

1. A method for displaying a selfie image, comprising:
capturing the selfie image of a target object;
receiving selection information of a processing mode for processing the selfie image, wherein the processing mode comprises mirroring processing and non-mirroring processing, the mirroring processing refers to a processing through which the selfie image is a mirror image of the target object, and the non-mirroring processing refers to a processing through which the selfie image is the same as an image obtained by flipping the mirror image of the target object left and right in a horizontal direction; and
processing the selfie image based on the selection information, and displaying the processed selfie image;
wherein receiving the selection information of the processing mode for processing the selfie image comprises one of:
receiving a switched processing mode for processing the selfie image as the selection information, in response to triggering of a button for switching between the mirroring processing and the non-mirroring processing; and
analyzing pictures stored in a picture database to obtain user preference, and generating the selection information based on the user preference.

2. The method according to claim 1, wherein capturing the selfie image comprises:
calling a photographing function by a shooting application to perform sampling; triggering, by the photographing function, a photographing callback function registered in the shooting application to receive sampled data; and returning, by the photographing callback function, the selfie image in a form of an array of bytes.

3. The method according to claim 2, wherein processing the selfie image based on the selection information comprises:
determining whether the received selection information is consistent with information of a preset processing mode; if the received selection information is inconsistent with the information of the preset processing mode, performing matrix transformation on the selfie image returned by the photographing callback function, so that the selfie image returned by the photographing callback function is flipped with respect to a Y-axis; and storing the flipped selfie image; and
wherein displaying the processed image comprises: displaying the matrix-transformed selfie image.

4. A method for displaying a selfie image, comprising:
capturing the selfie image of a target object;
receiving selection information of a processing mode for processing the selfie image, wherein the processing mode is mirroring processing or non-mirroring processing; and
processing the selfie image based on the selection information, and displaying the processed selfie image;
wherein capturing the selfie image comprises:
calling a photographing function by a shooting application to perform sampling; triggering, by the photographing function, a photographing callback function registered in the shooting application to receive sampled data; and returning, by the photographing callback function, the selfie image in a form of an array of bytes;
wherein processing the selfie image based on the selection information comprises:
determining whether the received selection information is consistent with information of a preset processing mode; if the received selection information is inconsistent with the information of the preset processing mode, performing matrix transformation on the selfie image returned by the photographing callback function, so that the selfie image returned by the photographing callback function is flipped with respect to a Y-axis; and storing the flipped selfie image;
wherein displaying the processed image comprises: displaying the matrix-transformed selfie image; and
wherein performing matrix transformation comprises:
generating a matrix transformation factor according to the following equation:

$$M'=S(sx,sy)*M,$$

where M represents an identity matrix, M' represents the matrix transformation factor, and S (sx, sy) represents a transformation coefficient, sx=1, and sy=−1; and
performing transformation on the selfie image using the matrix transformation factor.

5. The method according to claim 4, wherein the receiving selection information of a processing mode for processing the selfie image comprises one of:
receiving a switched processing mode for processing the selfie image as the selection information, in response to triggering of a button for switching between the mirroring processing and the non-mirroring processing; and
analyzing pictures stored in a picture database to obtain user preference, and generating the selection information based on the user preference.

6. The method according to claim 5, wherein a state prompt of the switched processing mode for the selfie image is presented on a shooting screen, when the button is triggered.

7. A apparatus for displaying a selfie image, comprising an image capturing unit, a selection information receiving unit, an image processing unit and an image displaying unit, wherein
the image capturing unit is configured to capture the selfie image of a target object;
the selection information receiving unit is configured to receive selection information of a processing mode for processing the selfie image, wherein the processing mode comprises mirroring processing and non-mirroring processing, the mirroring processing refers to a processing through which the selfie image is a mirror image of the target object, and the non-mirroring processing refers to a processing through which the selfie image is the same as an image obtained by flipping the mirror image of the target object left and right in a horizontal direction;
the image processing unit is configured to process the selfie image based on the selection information; and
the image displaying unit is configured to display the processed selfie image;
wherein receiving the selection information of the processing mode for processing the selfie image comprises one of:
receiving a switched processing mode for processing the selfie image as the selection information, in response to triggering of a button for switching between the mirroring processing and the non-mirroring processing; and
analyzing pictures stored in a picture database to obtain user preference, and generating the selection information based on the user preference.

8. The apparatus according to claim 7, wherein the image capturing unit comprises a sampling sub-unit and a selfie image returning sub-unit; and the sampling sub-unit is configured to call a photographing function via a shooting application to perform sampling, and the selfie image returning sub-unit is configured to trigger, via the photographing function, a photographing callback function registered in the shooting application to receive the sampled data, and return the selfie image in a form of an array of bytes.

9. The apparatus according to claim 8, wherein the image processing unit comprises a determining sub-unit, a transforming sub-unit and a storing sub-unit, wherein
the determining sub-unit is configured to determine whether the received selection information is consistent with information of a preset processing mode and trigger the transforming sub-unit if the received selection information is inconsistent with the information of the preset processing mode;
the transforming sub-unit is configured to perform matrix transformation on the selfie image returned by the photographing callback function, so that the selfie image returned by the photographing callback function is flipped with respect to a Y-axis;
the storing sub-unit is configured to store the flipped selfie image; and
the image displaying unit is configured to read out and display the stored flipped selfie image.

10. The apparatus according to claim 7, further comprising a button presenting unit, configured to present the button on a shooting screen during shooting the selfie image.

11. The method according to claim 1, wherein a state prompt of the switched processing mode for the selfie image is presented on a shooting screen, when the button is triggered.

12. The method according to claim 1, further comprising:
presenting a prompt on the shooting screen to prompt a user to select the processing mode for processing the selfie image.

13. The method according to claim 3, wherein performing the matrix transformation comprises:
generating a matrix transformation factor according to the following equation:

$$M'=S(sx,sy)*M,$$

where M represents an identity matrix, M' represents the matrix transformation factor, and S (sx, sy) represents a transformation coefficient, sx=1, and sy=−1; and
performing transformation on the selfie image using the matrix transformation factor.

14. The method according to claim 1, wherein the button is presented on a shooting screen during shooting the selfie image.

15. The method according to claim 4, further comprising:
presenting a prompt on a shooting screen to prompt a user to select the processing mode for processing the selfie image.

16. The method according to claim 4, wherein the button is presented on a shooting screen during shooting the selfie image.

17. The apparatus according to claim 9, wherein performing the matrix transformation comprises:
generating a matrix transformation factor according to the following equation:

$$M'=S(sx,sy)*M,$$

where M represents an identity matrix, M' represents the matrix transformation factor, and S (sx, sy) represents a transformation coefficient, sx=1, and sy=−1; and
performing transformation on the selfie image using the matrix transformation factor.

18. The apparatus according to claim 7, further comprising a state prompt unit configured to present a state prompt of the switched processing mode for the selfie image on a shooting screen, when the button is triggered.

19. The apparatus according to claim 7, further comprising a prompt unit configured to present a prompt on a shooting screen to prompt a user to select the processing mode for processing the selfie image.

* * * * *